(12) United States Patent
Raskovic et al.

(10) Patent No.: US 9,990,347 B2
(45) Date of Patent: Jun. 5, 2018

(54) BORDERLESS TABLE DETECTION ENGINE

(75) Inventors: Milos Raskovic, Belgrade (RS); Nenad Bozidarevic, Belgrade (RS); Milan Sesum, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 809 days.

(21) Appl. No.: 13/521,424

(22) PCT Filed: Jan. 23, 2012

(86) PCT No.: PCT/EP2012/000289
§ 371 (c)(1),
(2), (4) Date: Jul. 10, 2012

(87) PCT Pub. No.: WO2013/110289
PCT Pub. Date: Aug. 1, 2013

(65) Prior Publication Data
US 2013/0191715 A1 Jul. 25, 2013

(51) Int. Cl.
*G06F 17/00* (2006.01)
*G06F 17/24* (2006.01)
(Continued)

(52) U.S. Cl.
CPC ....... *G06F 17/245* (2013.01); *G06K 9/00463* (2013.01); *G06K 9/34* (2013.01); *G06K 2209/01* (2013.01)

(58) Field of Classification Search
CPC ............... G06F 17/30253; G06F 17/30256
See application file for complete search history.

(56) References Cited

U.S. PATENT DOCUMENTS 4,503,515 A 3/1985 Cuan et al.
4,648,067 A 3/1987 Repass et al.
(Continued)

FOREIGN PATENT DOCUMENTS

CN 1609846 A 4/2005
CN 101375278 A 2/2009
(Continued)

OTHER PUBLICATIONS

Liu, et al., "A Fast Preprocessing Method for Table Boundary Detection: Narrowing Down the Sparse Lines using Solely Coordinate Information", In Proceedings of the Eighth IAPR International Workshop on Document Analysis Systems, Sep. 16, 2008, 8 pages.

(Continued)

*Primary Examiner* — Mohammed-Ibrahim Zuberi
(74) *Attorney, Agent, or Firm* — Merchant & Gould P.C.

(57) ABSTRACT

A borderless table detection engine and associated method for identifying borderless tables appearing in data extracted from a fixed format document. Due to the lack of visible borders, reliable automated detection of a borderless table is difficult. The borderless table detection engine uses whitespace, rather than content, to detect borderless table candidates. Applying heuristic analysis, the borderless table detection engine discards borderless table candidates with a layout that lacks sufficient characteristics of a table and is unlikely to be a valid borderless table.

17 Claims, 12 Drawing Sheets

(51) Int. Cl.
*G06K 9/00* (2006.01)
*G06K 9/34* (2006.01)

(56) References Cited

U.S. PATENT DOCUMENTS

| | | | |
|---|---|---|---|
| 5,111,397 A | 5/1992 | Chirokas et al. | |
| 5,574,802 A | 11/1996 | Ozaki | |
| 5,737,442 A * | 4/1998 | Alam | 382/181 |
| 5,784,487 A | 7/1998 | Cooperman | |
| 5,870,767 A | 2/1999 | Kraft, IV | |
| 6,115,497 A | 9/2000 | Vaezi et al. | |
| 6,173,073 B1 | 1/2001 | Wang | |
| 6,289,121 B1 | 9/2001 | Abe et al. | |
| 6,336,124 B1 | 1/2002 | Alam et al. | |
| 6,360,011 B1 | 3/2002 | Katsumata et al. | |
| 6,377,704 B1 | 4/2002 | Cooperman | |
| 6,493,694 B1 | 12/2002 | Xu et al. | |
| 6,915,484 B1 | 7/2005 | Ayers et al. | |
| 7,027,071 B2 | 4/2006 | Chao | |
| 7,307,642 B2 | 12/2007 | Sack et al. | |
| 7,418,652 B2 | 8/2008 | Ornstein et al. | |
| 7,644,356 B2 | 1/2010 | Atkins et al. | |
| 7,676,741 B2 | 3/2010 | McGatha et al. | |
| 7,715,635 B1 | 5/2010 | Shagam et al. | |
| 7,788,580 B1 | 8/2010 | Goodwin et al. | |
| 8,014,013 B2 | 9/2011 | Owen et al. | |
| 8,023,738 B1 | 9/2011 | Goodwin et al. | |
| 8,023,740 B2 | 9/2011 | Djean | |
| 8,024,648 B2 | 9/2011 | Foehr et al. | |
| 8,200,009 B2 | 6/2012 | Lin | |
| 8,249,356 B1 | 8/2012 | Smith | |
| 8,254,681 B1 | 8/2012 | Poncin et al. | |
| 8,276,090 B2 | 9/2012 | Chen et al. | |
| 8,443,278 B2 | 5/2013 | Mansfield | |
| 8,718,364 B2 | 5/2014 | Enomoto | |
| 8,942,489 B2 | 1/2015 | Sesum et al. | |
| 9,042,653 B2 | 5/2015 | Lin et al. | |
| 9,081,412 B2 | 7/2015 | Kompalli et al. | |
| 9,251,413 B2 | 2/2016 | Meier et al. | |
| 9,703,759 B2 | 7/2017 | Zaric et al. | |
| 2002/0004713 A1* | 1/2002 | Wakabayashi | G06T 17/20 703/2 |
| 2002/0073035 A1 | 6/2002 | Saito | |
| 2002/0181779 A1 | 12/2002 | Hansen | |
| 2003/0167271 A1 | 9/2003 | Arnold et al. | |
| 2004/0093355 A1* | 5/2004 | Stinger | 707/104.1 |
| 2004/0146199 A1 | 7/2004 | Berkner et al. | |
| 2004/0205568 A1 | 10/2004 | Breuel et al. | |
| 2004/0205681 A1 | 10/2004 | Nozuyama | |
| 2004/0240735 A1* | 12/2004 | Medina | G06K 9/00456 382/173 |
| 2005/0188303 A1 | 8/2005 | Ayers et al. | |
| 2006/0147117 A1 | 7/2006 | Wakeam et al. | |
| 2006/0242166 A1 | 10/2006 | Larcheveque et al. | |
| 2006/0288278 A1 | 12/2006 | Kobayashi | |
| 2007/0035780 A1 | 2/2007 | Kanno | |
| 2007/0079236 A1 | 4/2007 | Schrier et al. | |
| 2007/0174761 A1 | 7/2007 | Lin et al. | |
| 2007/0177183 A1* | 8/2007 | Robinson | G06F 17/2765 358/1.14 |
| 2007/0234203 A1 | 10/2007 | Shagam | |
| 2007/0237428 A1 | 10/2007 | Goodwin et al. | |
| 2008/0123945 A1 | 5/2008 | Andrew et al. | |
| 2009/0110288 A1 | 4/2009 | Fujiwara | |
| 2009/0119578 A1 | 5/2009 | Relyea et al. | |
| 2009/0144614 A1 | 6/2009 | Dresevic et al. | |
| 2010/0174732 A1 | 7/2010 | Levy et al. | |
| 2010/0211866 A1 | 8/2010 | Nicholas et al. | |
| 2010/0254604 A1 | 10/2010 | Prabhakara et al. | |
| 2010/0306260 A1 | 12/2010 | Dejean | |
| 2011/0289395 A1 | 11/2011 | Breuel et al. | |
| 2012/0039536 A1 | 2/2012 | Djean et al. | |
| 2012/0096345 A1 | 4/2012 | Ho et al. | |
| 2012/0102388 A1 | 4/2012 | Fan | |
| 2012/0128249 A1 | 5/2012 | Panjwani | |
| 2012/0189203 A1 | 7/2012 | Lin et al. | |
| 2012/0311426 A1 | 12/2012 | Desai et al. | |
| 2012/0317470 A1* | 12/2012 | Dejean | 715/227 |
| 2012/0324341 A1 | 12/2012 | Djean | |
| 2013/0067313 A1 | 3/2013 | Leguin et al. | |
| 2013/0191732 A1 | 7/2013 | Lazarevic et al. | |
| 2013/0198599 A1* | 8/2013 | Kumar et al. | 715/227 |
| 2013/0223743 A1 | 8/2013 | Deryagin et al. | |
| 2014/0108897 A1 | 4/2014 | Boutelle et al. | |
| 2014/0208191 A1 | 7/2014 | Zaric et al. | |
| 2015/0135047 A1 | 5/2015 | Sesum et al. | |
| 2015/0262007 A1 | 9/2015 | Sesum et al. | |
| 2016/0026858 A1 | 1/2016 | Vogel | |
| 2016/0371244 A1 | 12/2016 | Chakra | |
| 2017/0220858 A1 | 8/2017 | Stitz et al. | |

FOREIGN PATENT DOCUMENTS

| | | |
|---|---|---|
| CN | 102105862 A | 6/2011 |
| CN | 102301377 A | 12/2011 |
| EP | 0779593 A2 | 6/1997 |
| EP | 1635268 A2 | 3/2006 |
| EP | 2343670 A2 | 7/2011 |
| JP | 63-304387 A | 12/1988 |
| JP | 8-185476 A | 7/1996 |
| JP | 9-171556 A | 6/1997 |
| JP | 2000-105836 A | 4/2000 |

OTHER PUBLICATIONS

Fang, et al., "A Table Detection Method for Multipage PDF Documents via Visual Seperators and Tabular Structures", In Proceedings of International Conference on Document Analysis and Recognition, Sep. 18, 2011, 5 pages.

Ramel, et al., "Detection, Extraction and Representation of Tables", In Proceedings of Seventh International Conference on Document Analysis and Recognition, Aug. 3, 2003, 5 pages.

Itonori, Katsuhiko, "Table Structure Recognition based on Textblock Arrangement and Ruled Line Position", In Proceedings of the Second International Conference on Document Analysis and Recognition, Oct. 20, 1993, 4 pages.

Cesarini, et al., "Trainable Table Location in Document Images", In Proceedings of 16th International Conference on Pattern Recognition, Aug. 11, 2002, 5 pages.

Tersteegen, et al., "Scantab: Table Recognition by Reference Tables", In Proceedings of Third IAPR Workshop on Document Analysis Systems, Nov. 4, 1998, 10 pages.

Embley, et al., "Table-processing Paradigms: a Research Survey", In International Journal of Document Analysis, May 9, 2006, 21 pages.

Cesarini F et al: "Structured document segmentation and representation by the modified X-V tree", Document Analysis and Recognition, 1999. ICDAR '99. Proceedings of the Fifth International Conference on Bangalore, India Sep. 20-22, 1999, Los Alamitos, CA, USA,IEEE Comput. Soc, US, Sep. 20, 1999 (Sep. 20, 1999), pp. 563-566.

Yalin Wang et al: "Table Detection via Probability Optimization" In: "Document Analysis Systems V", Jan. 1, 2002 (Jan. 1, 2002), Springer Berlin Heidelberg, Berlin, Heidelberg, vol. 2423, pp. 272-282.

Douglas et al: "Using natural language processing for identifying and interpreting tables in plain text.", Fourth Annual Symposium on Document Analysis and Information Retrieval, Apr. 1, 1995 (Apr. 1, 1995), pp. 535-546.

Baird H S: "Anatomy of a Versatile Page Reader", Proceedings of the IEEE, IEEE. New York, US, vol. 80, No. 7, Jul. 1, 1992 (Jul. 1, 1992), pp. 1059-1065.

Ana Costa E Silva et al: "Design of an end-to-end method to extract information from tables", International Journal of Document Analysis and Recognition (IJDAR), Springer, Berlin, DE, vol. 8, No. 2-3, Feb. 25, 2006 (Feb. 25, 2006), pp. 144-171.

International Search Report and Written Opinion for PCT/EP2012/000289 dated Apr. 4, 2013.

(56) References Cited

OTHER PUBLICATIONS

"Office Action Issued in Japanese Patent Application No. 2014-553620", dated Oct. 5, 2015, 11 Pages.
Hirayama, Yuki, "A Block Segmentation Method for Document Images with Complicated Column Structures", In Proceedings of the Second International Conference on Document Analysis and Recognition, Nov. 25, 1996, pp. 1790-1799.
Chinese First Office Action and Search Report Issued in Patent Application No. 201280067898.3 dated Aug. 17, 2016, 12 Pages.
Japanese Notice of Allowance Issued in Patent Application No. 2014-553620 dated May 11, 2016, without English Translation. 3 Pages.
Chinese Second Office Action and Search Report Issued in Patent Application No. 201280067898.3 dated Apr. 10, 2017, 5 Pages.
"ABBYY Fine Reader, Verision 12, User's Guide", https://www.abbyy.com/media/4712/guide_english.pdf, 2013, 116 pages.
"ABBYY FineReader 9.0 Sprint", http://www.abbyy.com/finereader/sprint-9/faq, Feb. 19, 2016, 8 pages.
"Can you convert a PDF table with Row and Column structure retaining in Excel?", http://www.a-pdf.com/faq/can-you-convert-a-pdf-table-with-row-and-column-structure-retaining-in-excel.htm, Jan. 14, 2010, 1 page.
"Chapter 16: Footnotes", http://www.sagehill.net/docbookxsl/Footnotes.html, Nov. 20, 2011, 2 pages.
"Convert Scanned PDF to Word", http://www.onlineocr.net, Jun. 25, 2014, 1 page.
"Convert PDF and JPG Files to Microsoft Word and Excel", https://finereaderonline.com/en-us, Jul. 23, 2014, 2 pages.
"Footnotes and Endnotes", http://word.tips.net/C0066_Footnotes_and_Endnotes.html, Nov. 20, 2012, 6 pages.
"Introduction to Optical Character Recognition Software", http://www.simpleocr.com/OCR_software_guide, Aug. 18, 2015, 17 pages.
"OCR to Excel", http://www.simpleocr.com/OCT_to_Excel, Aug. 20, 2015, 7 pages.
Borstein, "Exporting a PDF to Excel", http://blogs.adobe.com/acrolaw/2009/04/exporting-a-pdf-to-excel, Apr. 7, 2009, 3 pages.
Cesarini et al., "Trainable table location in document images," Pattern Recognition, Proceedings, 16th International Conference on Quebec City, Aug. 11, 2002, 6 pages.
Chao et al., "Layout and Content Extraction for PDF Documents", Computer Science, vol. 3163, Springer, Verlag Berlin & Heidelberg, Jan. 1, 2004, 12 pages.
Chinese Notice of Allowance in Application 201280067898.3, dated Aug. 3, 2017, 4 pages.
Duygulu et al., "A hierarchical representation of form documents for identification and retrieval", International Journal on Document Analysis and Recognition, vol. 5, 2002, pp. 17-27.
Glushko "Design Issues for Multi-Document Hypertexts", In Proceedings of Hypertext, http://couses.ischool.berkley.edu/i290-f/s02/readings/glushko_multidocs.pdf, Nov. 1989, 10 pages.
Golovchinsky et al., "Moving Markup: Repositioning Freeform Annotations", In: Proceedings of the 15th Annual ACM Symposium on User Interface Software and Technology, Paris, France, Oct. 27, 2002, 9 pages.
Hirano et al., "Text and Layout Information Extraction from Document Files of Various Formats Based on the Analysis of Page Description Language", In: Proceedings of Ninth International Conference on Document Analysis and Recognition, Sep. 23, 2007, 5 pages.
Liang et al., "Document Layout Structure Extraction Using Bounding Boxes of Different Entities", Proceedings of the 3rd IEEE Workshop on Applications of Computer Vision, WACV, 1996, pp. 278-283.
Lin et al., "Mathematical Formula Identification in PDF Documents", International Conference on Document Analysis and Recognition, IEEE, 2011, pp. 1419-1423.
Malleron et al., "Text Lines and Snippets Extraction for 19th Century Handwriting Documents Layout Analysis", In: Proceedings of 10th International Conference on Document Analysis and Recognition, Jul. 26, 2009, pp. 1001-1005.
Mini Image to Excel Table OCR Converter, http://www.minipdf.com/scan-to-excel/image-to-excel-table.html, Oct. 3, 2011, 3 pages.
Nagy et al., "A Prototype Document Image Analysis System for Technical Journals", Computer, vol. 25, No. 7, 1992, pp. 10-22.
PCT International Preliminary Report on Patentability in PCT/EP2012/000289, dated Jul. 29, 2014, 8 pages.
Ramakrishnan et al., "Layout-Aware Text Extraction from Full-Text PDF of Scientific Articles", Source Code for Biology and Medicine, BioMed Central, UK, May 28, 2012, 21 pages.
Schrier et al., "Adaptive Layout for Dynamically Aggregated Documents", In proceedings of 13th International Conference on Intelligent User Interfaces, Jan. 13, 2008, 10 pages.
Xiong, "Research on SVG-based vector graphics editing systems", Apr. 8, 2004, 57 pages. (No English Translation).
Korean Office Action in Application No. 10-2014-7020613, dated Nov. 1, 2017, 9 pages.
E Silva et al., "Design of an end-to-end method to extract information from tables," International Journal of Document Analysis and Recognition (IJDAR), 8(2-3), pp. 144-171, 2006.
Evans et al., "Using the New Photo Merge Panorama and Photo Merge HDR Tools in Adobe Photoshop Lightroom CC (2015 release)" Adobe Press, Retrieved from the Internet: <URL: http://adobepress.com/articles/printerfriendly/2339642>, Apr. 24, 2015, 3 pages.
ReadirisTM Pro 12, User Guide, 2010, 73 pages.
Wikipedia, "Comparison of optical character recognition software," Retrieved from the Internet: <URL: https://en.wikipedia.org/wiki/Comparison_of_optical_character_recognition_software>, retrieved on Jan. 12, 2018, 5 pages.
"Office Action Issued in European Patent Application No. 12701224.3", dated Feb. 5, 2018, 5 Pages.

\* cited by examiner

BORDERLESS TABLE DETECTION ENGINE

CROSS-REFERENCE TO RELATED APPLICATIONS

This application is a National Stage of International Application No. PCT/EP2012/000289, filed Jan. 23, 2012.

BACKGROUND

Flow format documents and fixed format documents are widely used and have different purposes. Flow format documents organize a document using complex logical formatting structures such as sections, paragraphs, columns, and tables. As a result, flow format documents offer flexibility and easy modification making them suitable for tasks involving documents that are frequently updated or subject to significant editing. In contrast, fixed format documents organize a document using basic physical layout elements such as text runs, paths, and images to preserve the appearance of the original. Fixed format documents offer consistent and precise format layout making them suitable for tasks involving documents that are not frequently or extensively changed or where uniformity is desired. Examples of such tasks include document archival, high-quality reproduction, and source files for commercial publishing and printing. Fixed format documents are often created from flow format source documents. Fixed format documents also include digital reproductions (e.g., scans and photos) of physical (i.e., paper) documents.

In situations where editing of a fixed format document is desired but the flow format source document is not available, the fixed format document must be converted into a flow format document. Conversion involves parsing the fixed format document and transforming the basic physical layout elements from the fixed format document into the more complex logical elements used in a flow format document. Existing document converters faced with complex elements, such as borderless tables, resort to base techniques designed to preserve the visual fidelity of the layout (e.g., text frames, line spacing, and character spacing) at the expense of the flowability of the output document. The result is a limited flow format document that requires the user to perform substantial manual reconstruction to have a truly useful flow format document. It is with respect to these and other considerations that the present invention has been made.

BRIEF SUMMARY

The following Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

One embodiment of the borderless table detection engine begins by selecting borderless table candidates using whitespace detection. The borderless table detection engine groups those whitespaces whose bounding boxes vertically overlap each other into whitespace groups. There is an edge between two whitespaces (i.e., the whitespaces are connected) if and only if the bounding boxes of the two whitespaces overlap vertically. All connected whitespaces make up one whitespace group.

Once the whitespace groups are detected, a table candidate is created from each of the whitespace groups. The topmost whitespace in each whitespace group is identified, and its top border defines the top border of the table candidate. Similarly, the bottommost whitespace in each whitespace group is identified, and its bottom border defines the bottom border of the table candidate. Next, all of the text between the top border and the bottom border of the table candidate is collected and assigned to the table candidate. After collecting the text, the borderless table detection engine establishes a bounding box for the table candidate. The bounding box is the smallest rectangle which contains all the text assigned to the table candidate.

After the initial set of table candidates is detected, the borderless table detection engine separately analyzes each table candidate. The first step is to screen the table candidates and discard low probability table candidates. Once the table candidates have been initially screened, the borderless table detection engine begins the process of reconstructing the cell layout for each remaining table candidate. The process of determining the cell layout starts with determining the column separator candidates using whitespace detection with a smaller minimum whitespace width threshold. Although useful for detecting potential column separators, the narrower minimum whitespace width threshold allows detection of whitespaces in places where column separators should not exist, i.e., inside a table cell. Accordingly, the whitespaces located during column separator detection are screened based on height and discarded, if appropriate.

Once whitespaces have been discarded, the borderless table detection engine creates the column separators at the right border of each remaining whitespace. Next, the borderless table detection engine adds a row separator for each column separator endpoint that does not lie on the top border or the bottom border. When available, the borderless table detection engine further splits the rows of the borderless table candidate using information, such as the rendering order of the text, obtained from a native fixed format document.

At the completion of cell layout reconstruction, the borderless table detection engine assigns the text to the individual cells. The text assignment process begins by screening each table candidate and discarding text likely to be part of the elements before or after the borderless table candidate. Finally, table candidates having only one column are discarded. The remaining table candidates are ready for reconstruction as tables, for example, during serialization.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Further features, aspects, and advantages will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

A borderless table detection engine and associated method for identifying borderless tables appearing in data extracted from a fixed format document is described herein and illustrated in the accompanying figures. Due to the lack of visible borders, reliable automated detection of a borderless table is difficult. The borderless table detection engine uses whitespace, rather than content, to detect borderless table candidates. Applying heuristic analysis, the borderless table detection engine discards borderless table candidates with a layout that lacks sufficient characteristics of a table and is unlikely to be a valid borderless table.

Figure 1:
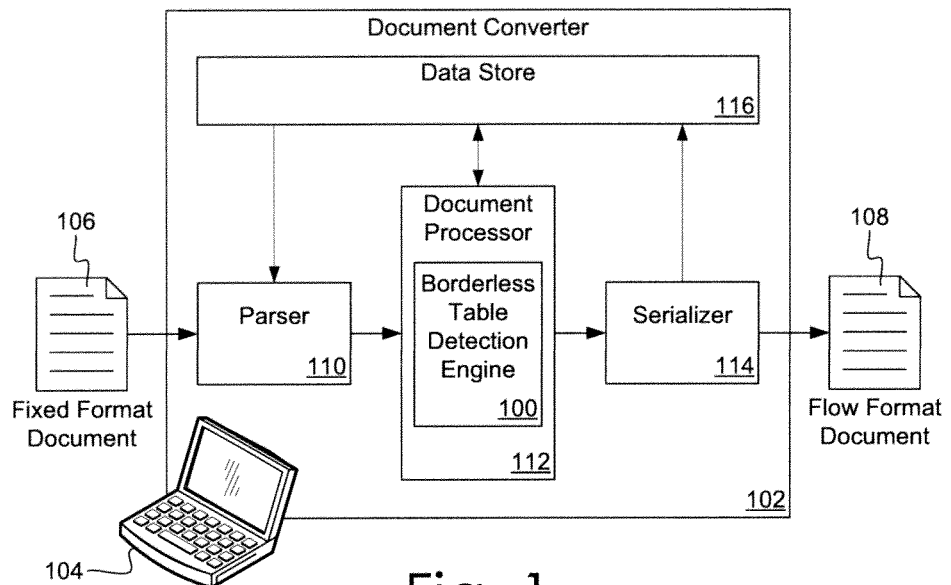
FIG. 1 is a block diagram showing one embodiment of system including the borderless table detection engine.

FIG. 1 illustrates a system incorporating the borderless table detection engine 100. In the illustrated embodiment, the borderless table detection engine 100 operates as part of a document converter 102 executed on a computing device 104. The document converter 102 converts a fixed format document 106 into a flow format document 108 using a parser 110, a document processor 112, and a serializer 114. The parser 110 extracts data from the fixed format document 106. The data extracted from the fixed format document is written to a data store 116 accessible by the document processor 112 and the serializer 114. The document processor 112 analyzes and transforms the data into flowable elements using one or more detection and/or reconstruction engines (e.g., the borderless table detection engine 100 of the present invention). Finally, the serializer 114 writes the flowable elements into a flowable document format (e.g., a word processing format).

Figure 2:
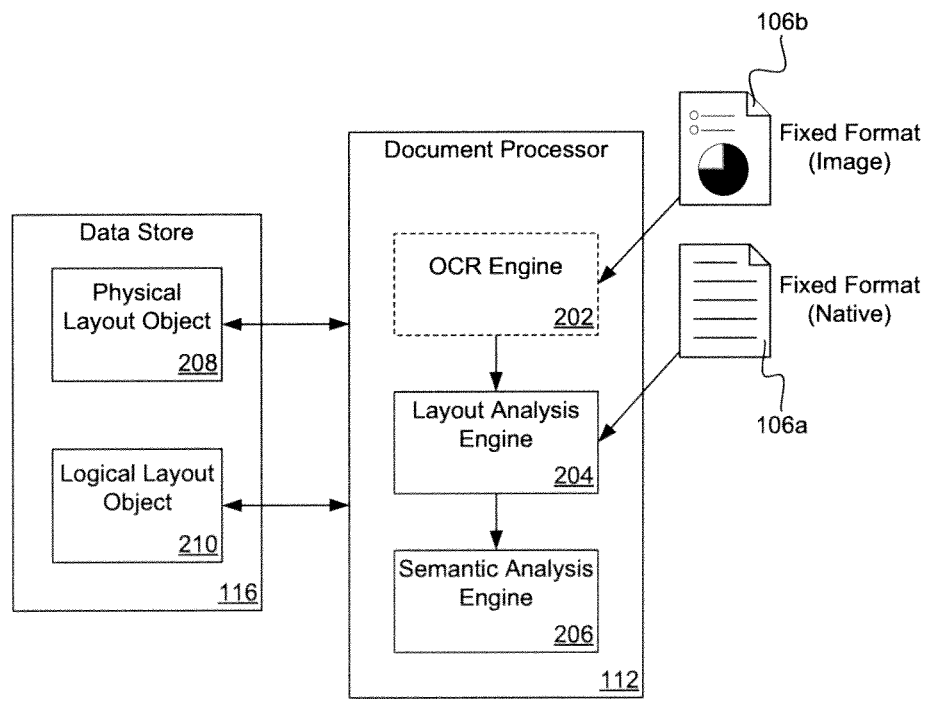
FIG. 2 is a block diagram showing the operational flow of one embodiment of the document processor.

FIG. 2 illustrates one embodiment of the operational flow of the document processor 112 in greater detail. The document processor 112 includes an optional optical character recognition (OCR) engine 202, a layout analysis engine 204, and a semantic analysis engine 206. The data contained in the data store 116 includes physical layout objects 208 and logical layout objects 210. In some embodiments, the physical layout objects 208 and logical layout objects 210 are hierarchically arranged in a tree-like array of groups (i.e., data objects). In various embodiments, a page is the top level group for the physical layout objects 208, and a section is the top level group for the logical layout objects 210. The data extracted from the fixed format document 106 is generally stored as physical layout objects 208 organized by the containing page in the fixed format document 106. The basic physical layout objects obtained from a fixed format document include text-runs, images, and paths. Text-runs are the text elements in page content streams specifying the positions where characters are drawn when displaying the fixed format document. Images are the raster images (i.e., pictures) stored in the fixed format document 106. Paths describe elements such as lines, curves (e.g., cubic Bezier curves), and text outlines used to construct vector graphics. Logical data objects include flowable elements such as sections, paragraphs, columns, and tables.

Where processing begins depends on the type of fixed format document 106 being parsed. A native fixed format document 106a created directly from a flow format source document contains the some or all of the basic physical layout elements. Generally, the data extracted from a native fixed format document 106a is available for immediate use by the document converter; although, in some instances, minor reformatting or other minor processor is applied to organize or standardize the data. In contrast, all information in an image-based fixed format document 106b created by digitally imaging a physical document (e.g., scanning or photographing) is stored as a series of page images with no additional data (i.e., no text-runs or paths). In this case, the optional optical character recognition engine 202 analyzes each page image and creates corresponding physical layout objects. Once the physical layout objects 208 are available, the layout analysis engine 204 determines the layout of the fixed format document and enriches the data store with new information (e.g., adds, removes, and updates the physical layout objects). After layout analysis is complete, the semantic analysis engine 206 enriches the data store with semantic information obtained from analysis of the physical layout objects and/or logical layout objects.

Figure 3A:
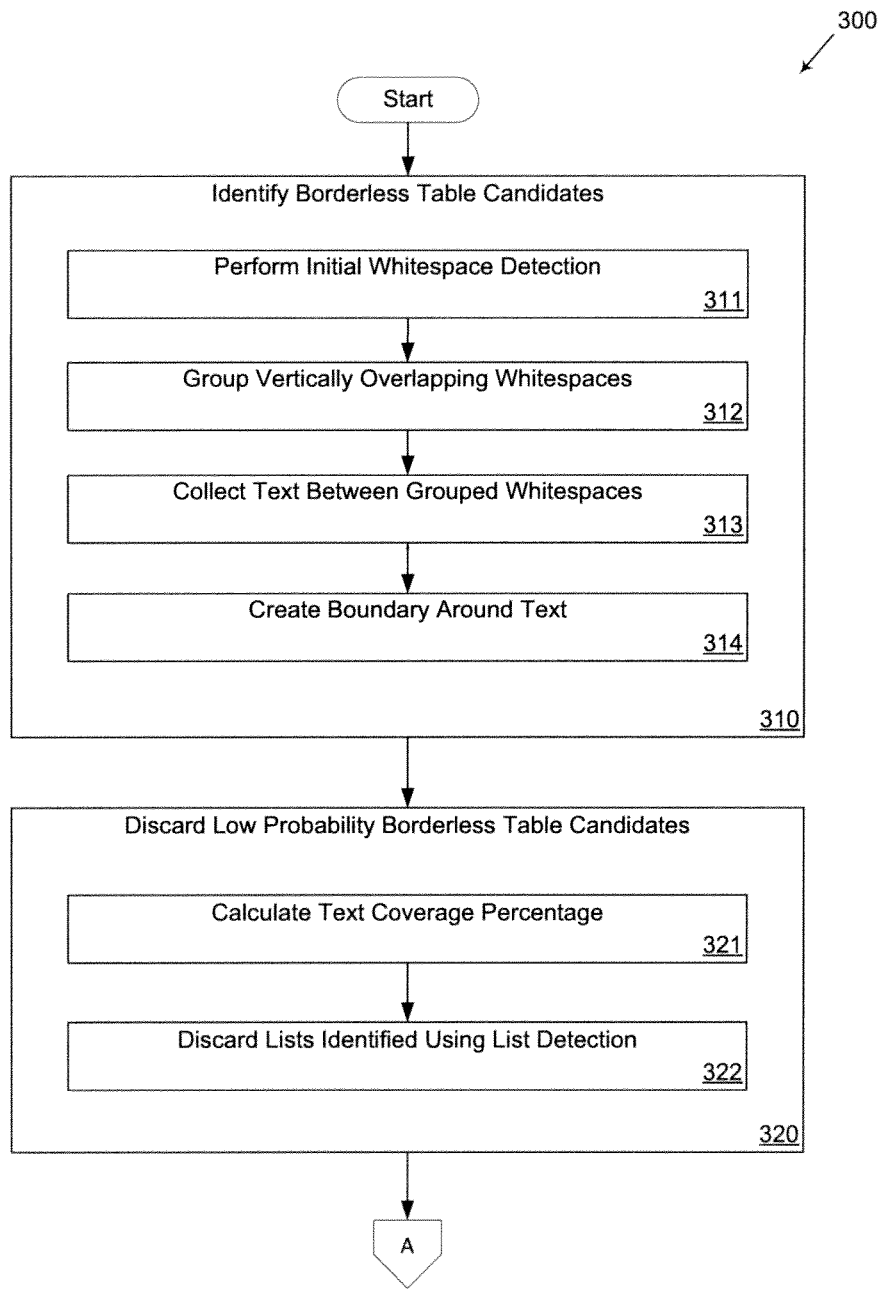
FIGS. 3A-B are a flow chart of one embodiment of the borderless table detection method executed by the borderless table detection engine.
Figure 3B:
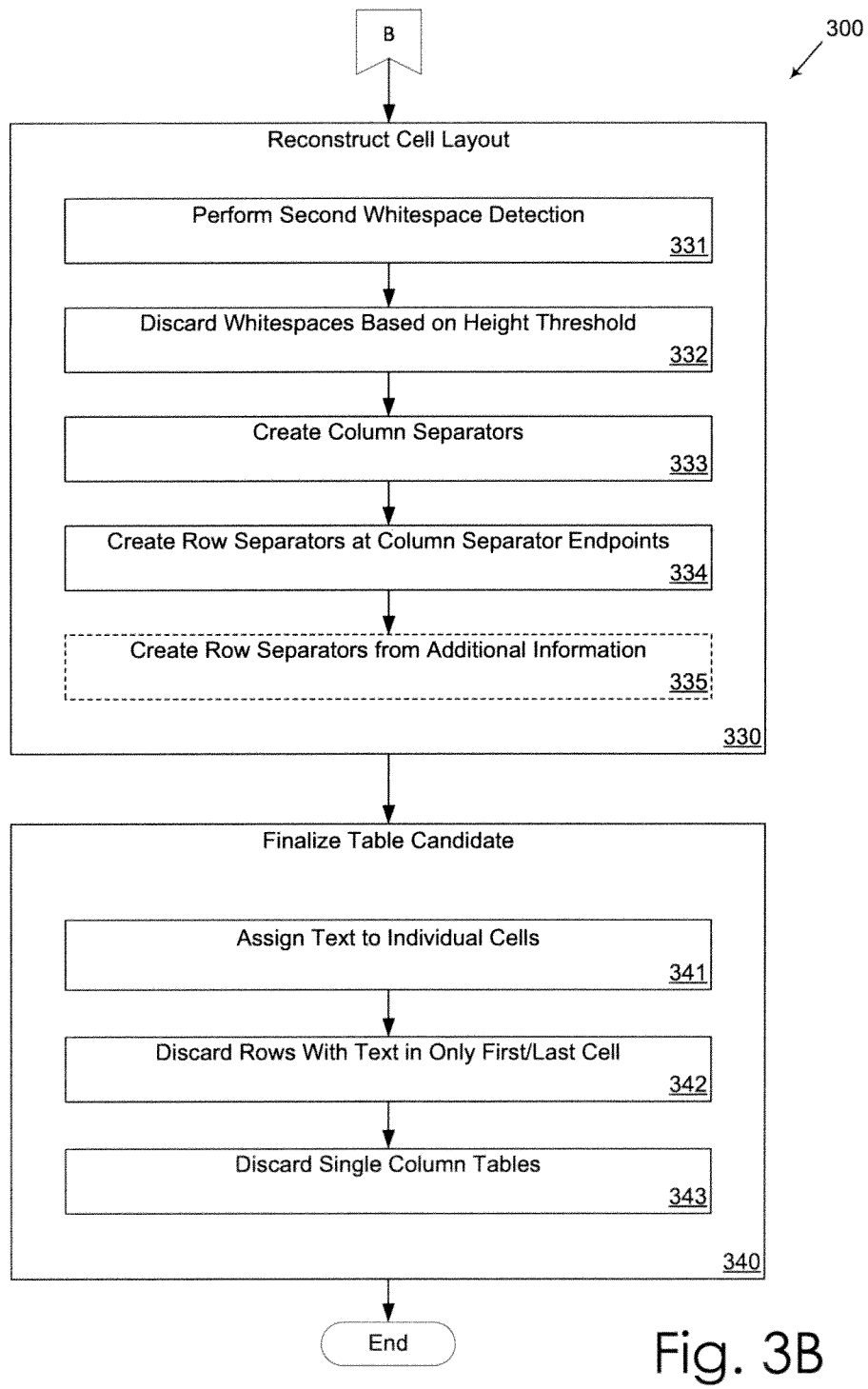

FIGS. 3A-B illustrates one embodiment of the borderless table detection method executed by the borderless table detection engine 100. The borderless table detection method 300 begins by identifying 310 borderless table candidates using whitespace detection 311 performed on data from a page of the fixed format document. The initial whitespace detection is used to find text which is geometrically in the same line, but too far apart (based on a selected minimum whitespace width threshold) to belong to the same group semantically (e.g., the same sentence). Each whitespace is, therefore, an indication that a borderless table might exist and contain the text to the left and/or right of the whitespace in question. The minimum whitespace width threshold used in the initial whitespace detection is selected to minimize the number of false positives for table area. In one embodiment, the whitespace detection process locates whitespaces positioned between (i.e., vertically overlapping) text runs. A single table containing more than two columns or merged cells will include multiple whitespaces. The borderless table detection engine 100 groups 312 those whitespaces whose bounding boxes vertically overlap each other into whitespace groups.

Figure 4A:
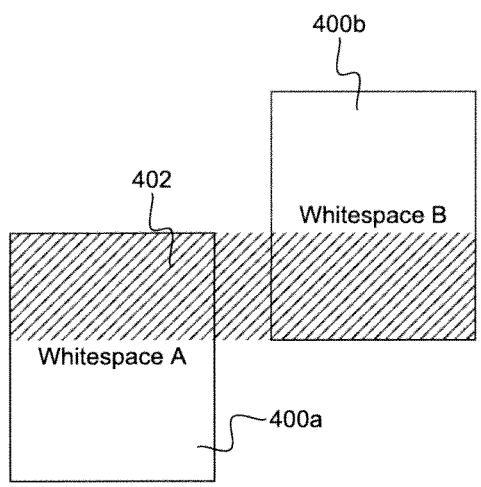
FIGS. 4A-4C illustrate the various positional relationships between two whitespaces on appearing on a page.
Figure 4B:
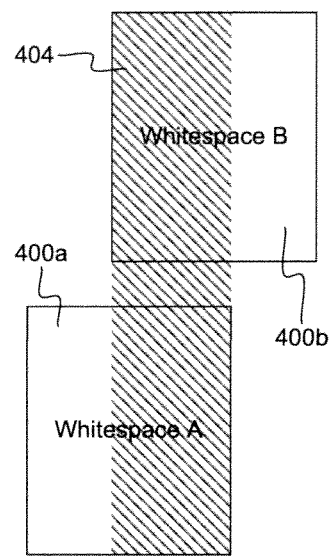
Figure 4C:
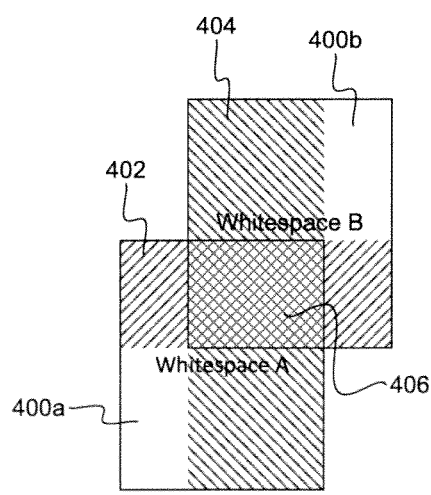

FIGS. 4A-4C illustrate the various positional relationships between two whitespaces 400a, 400b on a page. FIG. 4A is an example of vertical overlap (i.e., at least partial horizontal alignment) 402 between the first whitespace 400a and the second whitespaces 400b. Vertical overlap indicates that at least some portions of the two whitespaces 400a, 400b are aligned horizontally. FIG. 4B is an example of horizontal overlap (i.e., at least partial vertical alignment) 404 between the first whitespace 400a and the second whitespace 400b. FIG. 4C is an example of intersection 406 between the first whitespace 400a and the second whitespace 400b. Intersection indicates that at least some portions of the two whitespaces 400a, 400b are aligned horizontally and vertically. Based on vertical overlap, the whitespaces in FIGS. 4A and 4C indicate areas on a page that potentially contain borderless table candidates. However, the whitespaces in FIG. 4C are discarded because the horizontal overlap indicates that no text appears between the whitespaces. Final whitespace groups can be represented as nodes on a graph. Each whitespace on the page is one node in a graph. There is an edge between two nodes (i.e., the nodes are connected) if, and only if, the bounding boxes of the two whitespaces overlap vertically. All connected whitespaces make up one whitespace group.

Figure 5:
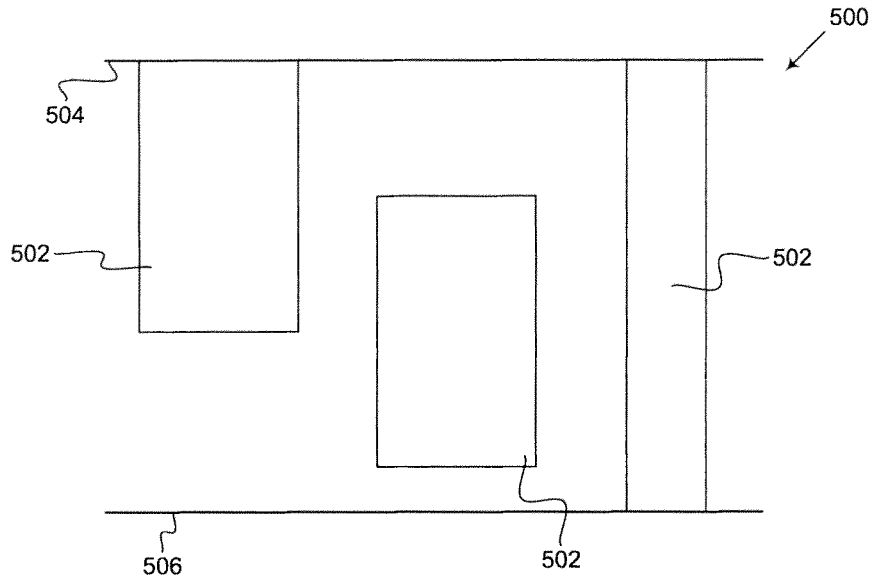
FIG. 5 illustrates an exemplary whitespace group indicating the location of a potential borderless table candidate.
Figure 6:
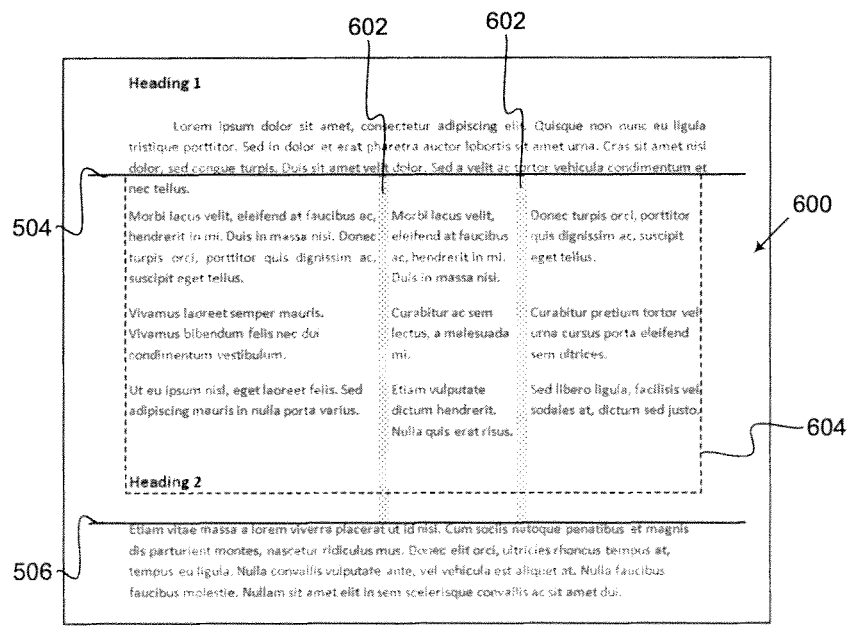
FIG. 6 illustrates an exemplary borderless table candidate with the whitespaces identified during the initial whitespace detection.

FIG. 5 illustrates an exemplary whitespace group 500 indicating the location of a potential borderless table candidate. The whitespace group 500 includes a number of connected whitespaces 502. The topmost whitespace in the whitespace group is identified, and the top edge defines the top border 504 of the borderless table candidate. Similarly, the bottommost whitespace in the whitespace group is identified, and the bottom edge defines the bottom border 506 of the table candidate. Next, all of the text between the top border and the bottom border is collected 313 and assigned to the borderless table candidate. FIG. 6 illustrates an exemplary borderless table candidate 600 showing the two whitespaces 602 identified during whitespace detection and the corresponding top border 504 and bottom border 506. After collecting the text between the top and bottom borders of the whitespace, the borderless table detection engine 100 creates 314 a bounding box 604 for the borderless table candidate. In various embodiments, the bounding box 604 is the smallest rectangle which contains all the text assigned to the borderless table candidate 600; however, in other embodiments, the dimensions of the bounding box may vary.

After the initial set of table candidates is detected, the borderless table detection engine 100 separately analyzes each table candidate. The first step is to screen 320 the table candidates and discard low probability table candidates. One test used to discard table candidates is to calculate 321 the area of a table candidate that is covered by text relative to total area of the table candidate. Unlike tables with borders, a borderless table contains only content (e.g., text or images), and the content of the borderless table determines the cell layout. Thus, it is unlikely that a borderless table will have little text and cover a large area. If the text coverage percentage falls below a selected threshold, the table candidate is discarded. Another test used to discard table candidates is to check for table candidates that are actually bulleted or numbered lists. To the borderless table detection engine, a bulleted/numbered list appears as a column of bullets or numbers and a column of text, or other content, separated by a vertical whitespace. Because of the structural resemblance between bullet/numbered lists and borderless tables, a bulleted/numbered list may be identified as a borderless table candidate. Accordingly, applying list detection allows the borderless table detection engine 100 to discard 322 borderless table candidates that match the structure of a bulleted/numbered list.

Figure 8:
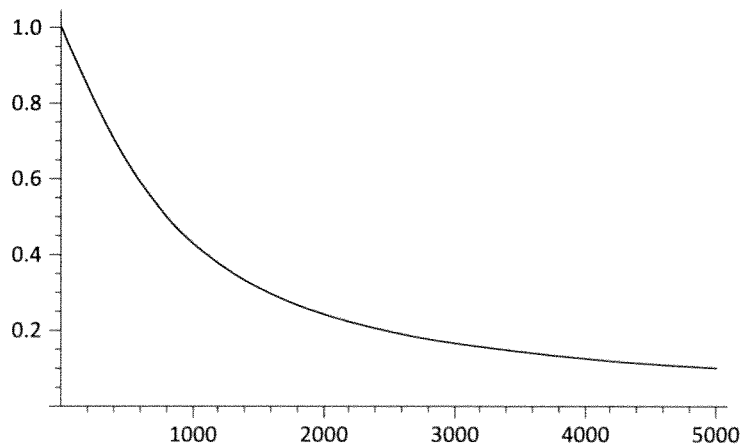
FIG. 8 is a graph of the minWhitespaceHeight/tableHeight ratio used in one embodiment of the borderless table detection engine.

Once the table candidates have been initially screened, the borderless table detection engine 100 begins the process of reconstructing 330 the cell layout for each remaining table candidate. The reconstruction process starts with performing 331 a second whitespace detection on the table candidate using a smaller minimum whitespace width threshold to detect the narrower whitespaces likely to correspond to column breaks. Although useful for detecting potential column separators, the narrow minimum whitespace width threshold allows detection of whitespaces in places where column separators should not exist, i.e., inside a table cell. In the case of borderless tables, the cell layout is usually fairly regular, with a grid-like structure and few merged cells. Because of this, most whitespaces between columns span across the entire height of the borderless table, or at least across a substantial portion thereof. In one embodiment, the threshold for whitespace height depends on the height of the table and the average text height. FIG. 8 graphs the minWhitespaceHeight/tableHeight ratio calculated using the following function:

$$minWhitespaceHeight = tableHeight \times \left[1 - \frac{2}{\pi} \times \arctan\left(\frac{tableHeight}{avgTextHeight \times \text{factor}}\right)\right]$$

where the factor is a constant. As seen in the graph, the minWhitespaceHeight/tableHeight ratio decreases as the table height increases. Accordingly, the detected whitespaces are screened based on height and discarded, if appropriate.

Figure 7:
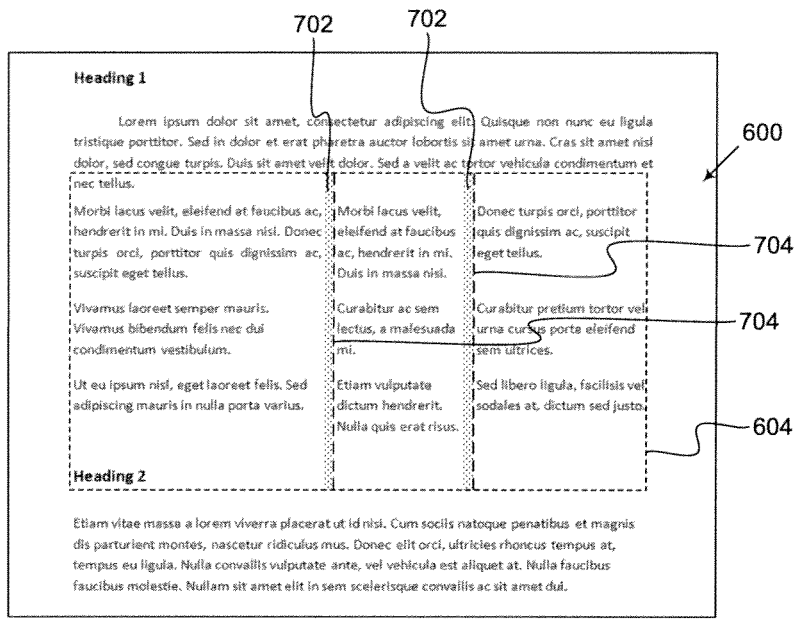
FIG. 7 graphically illustrates the whitespaces detected during whitespace detection process.

Once whitespaces not meeting the height threshold have been discarded 332, the borderless table detection engine 100 creates the column separators. FIG. 7 graphically illustrates the whitespaces 702 detected during the whitespace detection process using the smaller minimum whitespace width threshold and the column separators 704 created by the borderless table detection engine 100. The column separators 704 are placed 333 at the right border of each whitespace 702 in the borderless table candidate 600. To complete the cell layout, the borderless table detection engine 100 creates the row separators. In order to achieve a valid cell layout, each endpoint of each column separator should lie on a row separator, the table candidate top border, or the table candidate bottom border. The borderless table detection engine 100 adds a row separator for each column separator endpoint that is not on the top border or the bottom border 334. Starting at a selected column separator endpoint, the borderless table detection engine 100 draws a horizontal line that extends to the first column separator (including the table candidate left border) encountered to the left and to the first column separator (including the table candidate left border) encountered to the right (or the left/right table border).

Some native fixed format documents include information, such as the rendering order of the text, which allows the borderless table detection engine 100 to further split the rows of the borderless table candidate. In a table, the rendering order of the cells is left-to-right, top-to-bottom, which means that the rendering order of the text in one row is smaller than the rendering order of the text in all the following rows. When such information is available, the borderless table detection engine 100 draws 335 a row separator between consecutive text lines, from the left border to the right border, and checks the following inequality:

max(renderingOrder)(X)
⌊X∈textAboveTheRowSeparator)<min(renderingOrder(Y)|Y∈textBelowTheRowSeparator)

If the inequality does not hold true, the row separator is discarded. When a row separator based on rendering order overlaps with a row separator created during column separator detection, the row separator created during column separator is discarded in favor of the row separator based on rendering order that spans the entire width of the table candidate.

Figure 9:
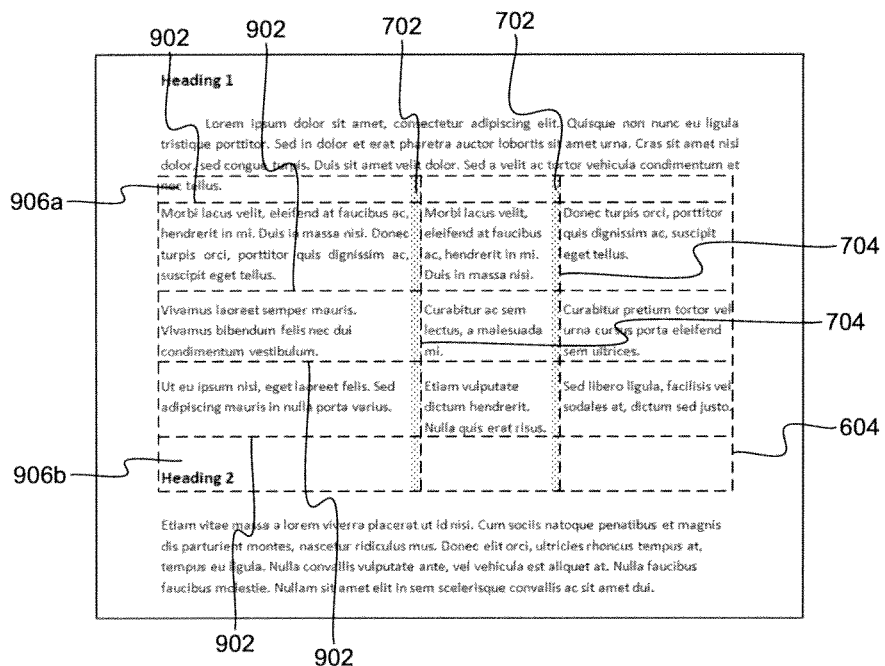
FIG. 9 illustrates a borderless table candidate that has collected a heading below the table and a part of the paragraph above the table.

At the completion of cell layout reconstruction, the layout of the borderless table is finalized 340. FIG. 9 illustrates an example of the final cell layout 900 includes the table candidate border 604, the column separators 704 and the row separators 902. First, the borderless table detection engine 100 assigns 341 the text to the individual cells the borderless table detection engine 100 assigns the text to the individual cells. Without the aid of defined borders, the whitespace detection used by the borderless table detection engine 100 potentially captures content above and below the borderless table candidate that is not actually part of the borderless table. For example, the last line of a paragraph preceding the table or a heading following the table candidate may be collected if it fits inside the first or last column. FIG. 9 shows a portion of the preceding paragraph assigned to the first cell 906a of the first row and a heading assigned to the first cell 906b of the last row. Accordingly, the text assignment process screens 342 each table candidate and discards such text. More precisely, the borderless table detection engine 100 analyzes the rows of the table candidate, starting from the top, and discards the row if only the first cell or the last cell in the row contains text. This analysis ends once a row containing text in more than one cell is encountered. The same approach is used for bottom table rows, starting from the bottom. Although the screen process potentially might remove some valid rows from the table, erring in this manner provides a better user experience because no paragraphs are erroneously split, as would be the case when if invalid rows were not removed. Finally, borderless table candidates having only one column are discarded 343 because such content inside a borderless table would be reconstructed in the same manner as regular content outside the table. At this point, the remaining borderless table candidates are ready for reconstruction as flowable tables, for example, during serialization.

The borderless table detection engine and associated borderless table detection method described herein is useful to detect content having a structure corresponding to a borderless table in a fixed format document, thereby allowing the content to be reconstructed as a flowable table when the fixed format document is converted into a flow format document. While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

Figure 10:
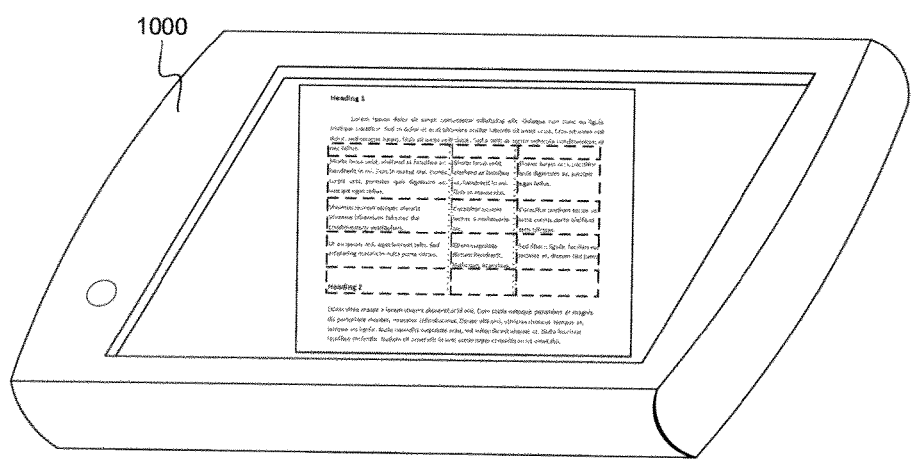
FIG. 10 illustrates a tablet computing device executing one embodiment of the borderless table detection engine.
Figure 11:
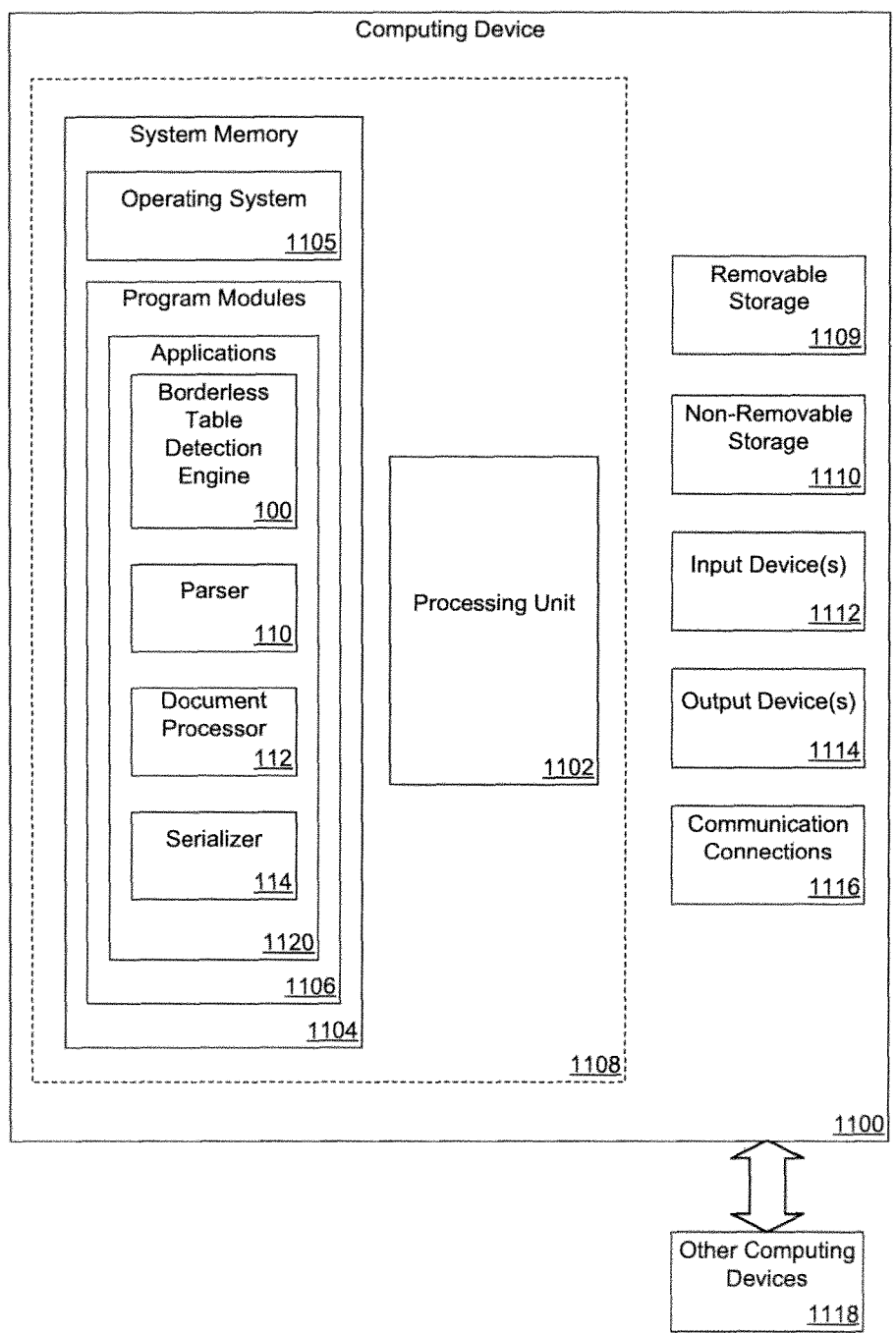
FIG. 11 is a simplified block diagram of an exemplary computing device suitable for practicing embodiments of the borderless table detection engine.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers. FIG. 10 illustrates an exemplary tablet computing device 1000 executing an embodiment of the borderless table detection engine 100. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 11 through 13 and the associated descriptions provide a discussion of a variety of operating environments in which embodiments of the invention may be practiced. However, the devices and systems illustrated and discussed with respect to FIGS. 11 through 13 are for purposes of example and illustration and are not limiting of a vast number of computing device configurations that may be utilized for practicing embodiments of the invention, described herein.

FIG. 11 is a block diagram illustrating example physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the borderless table detection engine 100, the parser 110, the document processor 112, and the serializer 114. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106, such as the borderless table detection engine 100, the parser 110, the document processor 112, and the serializer 114 may perform processes including, for example, one or more of the stages of the borderless table detection method 300. The aforementioned process is an example, and the processing unit 1102 may perform other processes. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the borderless table detection engine 100, the parser 110, the document processor 112, and the serializer 114 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may also include one or more communication connections 1116 allowing communications with other computing devices 1118. Examples of suitable communication connections 1116 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communications media. Computer storage media may include volatile and nonvolatile, removable and non-removable media implemented in any method or technology for storage of information, such as computer readable instructions, data structures, program modules, or other data. The system memory 1104, the removable storage device 1109, and the non-removable storage device 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 1100. Any such computer storage media may be part of the computing device 1100.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12A:
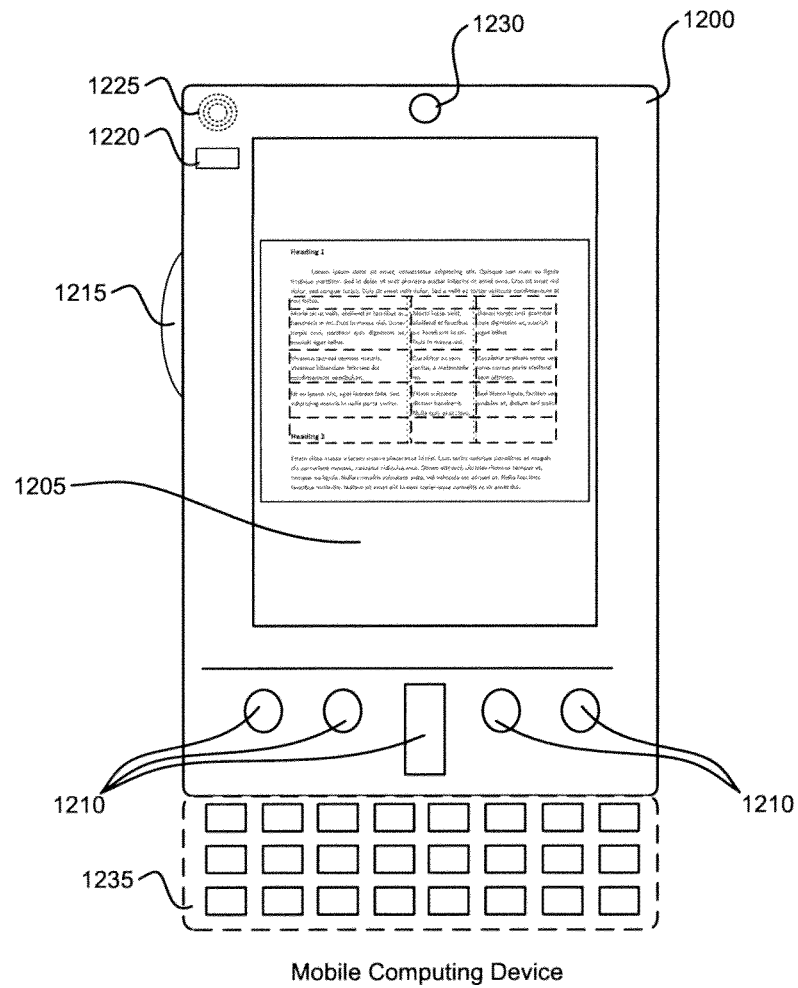
FIG. 12A illustrates one embodiment of a mobile computing device executing one embodiment of the borderless table detection engine.
Figure 12B:
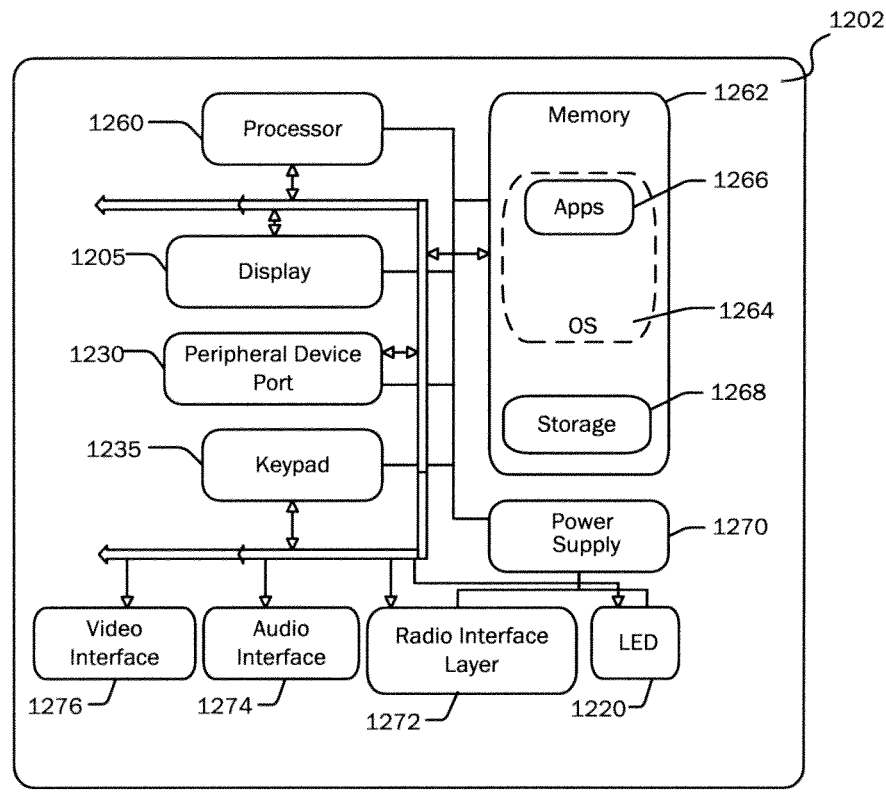
FIG. 12B is a simplified block diagram of an exemplary mobile computing device suitable for practicing embodiments of the borderless table detection engine.
Figure 13:
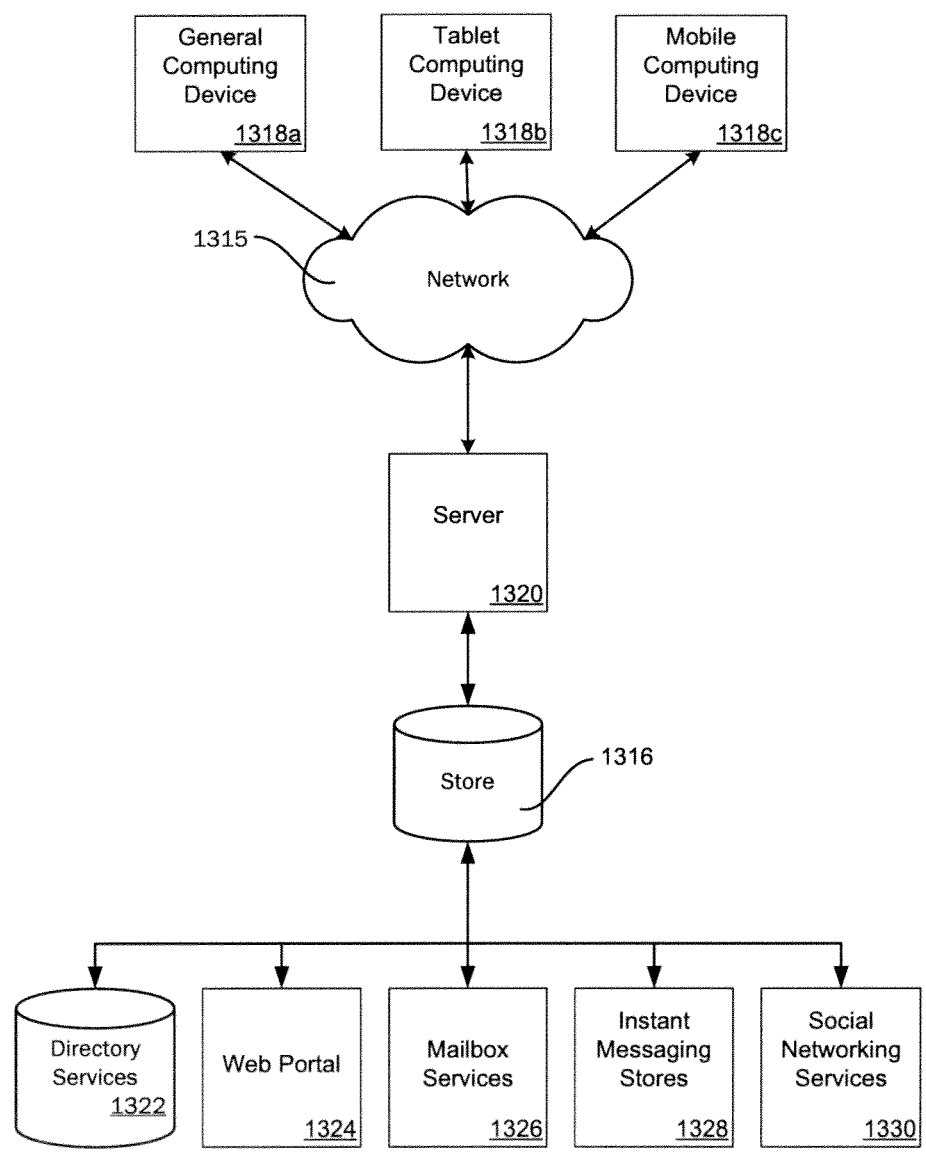
FIG. 13 is a simplified block diagram of an exemplary distributed computing system suitable for practicing embodiments of the borderless table detection engine.

FIGS. 12A and 12B illustrate a mobile computing device 1200, for example, a mobile telephone, a smart phone, a tablet personal computer, a laptop computer, and the like, with which embodiments of the invention may be practiced. With reference to FIG. 12A, an exemplary mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one embodiment of a mobile computing device. That is, the mobile computing device 1200 can incorporate a system (i.e., an architecture) 1202 to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the borderless table detection engine 100, the parser 110, the document processor 112, and the serializer 114 described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world", via a communications carrier or service provider. Transmissions to and from the radio 1272 are conducted under control of the operating system 1264. In other words, communications received by the radio 1272 may be disseminated to the application programs 1266 via the operating system 1264, and vice versa.

The radio 1272 allows the system 1202 to communicate with other computing devices, such as over a network. The radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 1202 provides notifications using the visual indicator 1220 that can be used to provide visual notifications and/or an audio interface 1274 producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268. Computer storage media may include volatile and nonvolatile, removable and non-removable media implemented in any method or technology for storage of information, such as computer readable instructions, data structures, program modules, or other data.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 13 illustrates one embodiment of the architecture of a system for providing the borderless table detection engine 100, the parser 110, the document processor 112, and the serializer 114 to one or more client devices, as described above. Content developed, interacted with or edited in association with the borderless table detection engine 100, the parser 110, the document processor 112, and the serializer 114 may be stored in different communication channels or other storage types. For example, various documents may be stored using a directory service 1322, a web portal 1324, a mailbox service 1326, an instant messaging store 1328, or a social networking site 1330. The borderless table detection engine 100, the parser 110, the document processor 112, and the serializer 114 may use any of these types of systems or the like for enabling data utilization, as described herein. A server 1320 may provide the borderless table detection engine 100, the parser 110, the document processor 112, and the serializer 114 to clients. As one example, the server 1320 may be a web server providing the borderless table detection engine 100, the parser 110, the document processor 112, and the serializer 114 over the web. The server 1320 may provide the borderless table detection engine 100, the parser 110, the document processor 112, and the serializer 114 over the web to clients through a network 1315. By way of example, the client computing device 1318 may be implemented as the computing device 1100 and embodied in a personal computer 1318a, a tablet computing device 1318b and/or a mobile computing device 1318c (e.g., a smart phone). Any of these embodiments of the client computing device 1318 may obtain content from the store 1316. In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

What is claimed is:

1. A borderless table detection method for detecting a borderless table contained in data parsed from a fixed format document, said method comprising the steps of:
    grouping whitespaces having vertical overlap with each other into a whitespace group having a top border and a bottom border;
    collecting text located between a top border and a bottom border of said whitespace group as collected text;
    creating column separators positioned at a right edge of each whitespace detected within a table candidate comprising said collected text and having an upper border, a lower border, a left border, and a right border, each said column separator defining a pair of endpoints;
    creating a first set of row separators comprising a row separator located at selected said endpoints to form a plurality of individual cells;
    creating a second set of row separators between successive lines of text in said table candidate based on a rendering order of the text obtained from the fixed format document when the rendering order of the text is available from the fixed format document;
    discarding said row separator from said second set of row separators when the maximum vertical position or rendering order of the text of said collected text above said row separator is greater than the minimum vertical position or the rendering order of the text of said collected text below said row separator;
    discarding a first said row separator from said first set of row separators when said first row separator is collinear with a second said row separator from said second set of row separators; and
    assigning collected text to a corresponding one of said plurality of individual cells.

2. The borderless table detection method of claim 1 characterized in that each said whitespace detected within said table candidate has a height exceeding a threshold height corresponding to substantial portion of the height of said table candidate.

3. The borderless table detection method of claim 1 characterized in that said threshold height varies as a function of the height of the table candidate and the average height of said collected text.

4. The borderless table detection method of claim 1 characterized in that said step of creating a first set of row separators further comprises the steps of:
    drawing a horizontal line extending to the left from said each said endpoint that does not lie on either said upper border or said lower border until said horizontal line meets another said column separator or said left border; and
    drawing a horizontal line extending to the right from said each said endpoint that does not lie on either said upper border or said lower border until said horizontal line meets another said column separator or said right border.

5. The borderless table detection method of claim 1 further comprising the steps of:
    calculating a text coverage percentage corresponding to the area of said table candidate covered by said collected text; and
    discarding said table candidate if said text coverage percentage is less than a selected text coverage threshold.

6. The borderless table detection method of claim 1, further comprising the steps of:
    detecting bulleted and/or numbered lists within said table candidate; and
    discarding said table candidate if said table candidate contains only a single said bulleted and/or numbered list.

7. The borderless table detection method of claim 1 characterized in that each row defined by said row separators has a first cell and a last cell, said method further comprising the step of discarding rows where said collected text is assigned to only said first cell or said last cell of that row.

8. The borderless table detection method of claim 1 further comprising the step of discarding tables containing only a single column.

9. A system for detecting a borderless table appearing in a fixed format document, said system comprising:
    a hardware memory device that stores programmed instructions; and
    a computing device that executes the stored programmed instructions, the execution of the stored programmed instructions causing the computing device to operate as a borderless table detection engine application operable to:
        detect whitespaces on a page using a first minimum whitespace width threshold;
        group said whitespaces having vertical overlap with each other into a whitespace group having a top border and a bottom border;
        collect text located between a top border and a bottom border of said whitespace group as collected text;

create a bounding box around said collected text to form a table candidate, said bounding box having an upper border, a lower border, a left border, and a right border;

detect whitespaces within said table candidate using a second minimum whitespace width threshold, said second minimum whitespace width threshold being smaller than said first minimum whitespace width threshold;

create column separators positioned at a right edge of each said whitespace within said table candidate, each said column separator defining a pair of endpoints;

create a first set of row separators comprising a row separator located at each said endpoint that does not lie on either said upper border of said bounding box or said lower border of said bounding box to form a plurality of individual cells;

create a second set of row separators between successive lines of text in said table candidate based on a rendering of the text obtained from the fixed format document when the rendering order of the text is available from the fixed format of the document;

discard said row separator from said second set of row separators when the maximum vertical position or rendering order of the text of said collected text above above said row separator is greater than the minimum vertical position or the rendering order of said collected text below said row separator;

discard a first row separator form said first set of row separators when said first row separator is collinear with a second row separator from said second set of row separators; and assign collected text to a corresponding one of said plurality of individual cells wherein each row defined by said row separators has a first cell and a last cell.

10. The system of claim 9 characterized in that said borderless table detection engine application is operable to create column separators from whitespaces detected within said table candidate that have a height exceeding a variable threshold height corresponding to substantial portion of the height of said table candidate and varying as a function of the height of the table candidate and the average height of said collected text.

11. The system of claim 9 characterized in that said borderless table detection engine application is operable to draw a horizontal line extending to each side of each said endpoint that does not lie on either said upper border of said bounding box or said lower border of said bounding box until said horizontal line meets another said column separator on each side of said endpoint.

12. The system of claim 9 characterized in that said borderless table detection engine application is operable to discard said table candidate if a text coverage percentage corresponding to the area of said table candidate covered by said collected text is less than a selected text coverage threshold.

13. The system of claim 9 further comprising the steps of creating row separators positioned a vertical position selected from the group consisting of each said endpoint that does not lie on either said upper border of said bounding box or said lower border of said bounding box and successive lines of text in said table candidate determined using rendering order information obtained from the fixed format document to form a cell layout containing a plurality of individual cells.

14. The system of claim 9 characterized in that said borderless table detection engine application is operable to discard rows where said collected text is assigned to only said first cell or said last cell of that row.

15. A computer readable hardware medium containing computer executable instructions which, when executed by a computer, perform a method to detect borderless tables when converting a fixed format document to a flow format document, said method comprising the steps of:

detecting whitespaces on a page using a first minimum whitespace width threshold;

grouping said whitespaces having vertical overlap with each other into a whitespace group having a top border and a bottom border;

collecting text located between a top border and a bottom border of said whitespace group as collected text;

creating a bounding box around said collected text to form a table candidate, said bounding box having an upper border, a lower border, a left border, and a right border;

detecting whitespaces within said table candidate using a second minimum whitespace width threshold, said second minimum whitespace width threshold being smaller than said first minimum whitespace width threshold;

creating column separators positioned at a right edge of each said whitespace within said table candidate, each said column separator defining a pair of endpoints;

creating a first set of row separators comprising drawing a horizontal line extending to the left from said each said endpoint that does not lie on either said upper border of said bounding box or said lower border of said bounding box until said horizontal line meets another said column separator or said left border and to the right from said each said endpoint that does not lie on either said upper border of said bounding box or said lower border of said bounding box until said horizontal line meets another said column separator or said right border to form a first set of row separators;

creating a second set of row separators between successive lines of text in said table candidate based on rendering order of the text obtained from the fixed format document when the rendering order of the text is available from the fixed format document;

discarding said row separator from said second set of row separators when the maximum vertical position or rendering order of the text of said collected text above said row separator is greater than the minimum vertical position or rendering order of the text of said collected text below said row separator;

discarding a first said row separator from said first set of row separators when said first row separator is collinear with a second said row separator from said second set of row separators; and assigning collected text to a corresponding one of said plurality of individual cells wherein each row defined by said row separators has a first cell and a last cell.

16. The computer readable hardware medium of claim 15 characterized in that said method further comprises the step of discarding said table candidate if a text coverage percentage corresponding to the area of said table candidate covered by said collected text is less than a selected text coverage threshold.

17. The computer readable hardware medium of claim 15 characterized in that said method further comprises the step of discarding rows where said collected text is assigned to only said first cell or said last cell of that row.

* * * * *